United States Patent
Seo et al.

(10) Patent No.: US 8,346,410 B2
(45) Date of Patent: Jan. 1, 2013

(54) METHOD FOR IMPROVING MANEUVERABILITY AND CONTROLLABILITY BY SIMULTANEOUSLY APPLYING BOTH REACTION WHEEL-BASED ATTITUDE CONTROLLER AND THRUSTER-BASED ATTITUDE CONTROLLER

(75) Inventors: Hyun Ho Seo, Daejeon-si (KR); Ki Lyuk Yong, Daejeon-si (KR); Shi Hwan Oh, Daejeon-si (KR); Hong Taek Choi, Daejeon-si (KR); Seon Ho Lee, Daejeon-si (KR); Jo Ryeong Yim, Daejeon-si (KR); Yong Bok Kim, Daejeon-si (KR); Hye Jin Lee, Daejeon-si (KR)

(73) Assignee: Korea Aerospace Research Institute (KR)

( * ) Notice: Subject to any disclaimer, the term of this patent is extended or adjusted under 35 U.S.C. 154(b) by 604 days.

(21) Appl. No.: 12/576,203

(22) Filed: Oct. 8, 2009

(65) Prior Publication Data

US 2010/0168938 A1   Jul. 1, 2010

(30) Foreign Application Priority Data

Dec. 30, 2008   (KR) ................. 10-2008-0136668

(51) Int. Cl.
*G05D 1/00* (2006.01)
(52) U.S. Cl. ....... 701/13; 244/171; 244/158.1; 244/165; 244/169
(58) Field of Classification Search ............. 701/13; 244/165, 158.1, 171, 169; *G05D 1/00; B64G 1/28; B64G 1/26*
See application file for complete search history.

(56) References Cited

U.S. PATENT DOCUMENTS

| | | | | |
|---|---|---|---|---|
| 4,767,084 | A | * | 8/1988 | Chan et al. ................. 244/164 |
| 5,047,945 | A | | 9/1991 | Paluszek .................... 364/434 |
| 6,021,979 | A | | 2/2000 | Bender et al. .............. 244/164 |
| 6,032,903 | A | * | 3/2000 | Fowell et al. .............. 244/165 |
| 6,076,773 | A | * | 6/2000 | Salvatore ................... 244/164 |
| 6,463,365 | B1 | * | 10/2002 | Anagnost et al. ............ 701/13 |
| 7,198,232 | B1 | * | 4/2007 | Ratan et al. ................ 244/165 |

(Continued)

FOREIGN PATENT DOCUMENTS

EP   0 794 122   10/1997

(Continued)

OTHER PUBLICATIONS

"A Study on the Wheel Momentum Management Logic of a Geosynchronous Satellite" p. 85-94.

(Continued)

*Primary Examiner* — Tuan C. To
(74) *Attorney, Agent, or Firm* — Hayes Soloway P.C.

(57) ABSTRACT

Provided are an attitude control system and method of a spacecraft of an artificial satellite that may enhance a maneuverability and a controllability by simultaneously applying a reaction wheel and a thruster among drive units used to maneuver an attitude of the spacecraft of the artificial satellite. The attitude control system may include: a thruster-based attitude controller which control firing time of thrusters mounted on the spacecraft; and a reaction wheel-based attitude controller controlling driving of a reaction wheel mounted on the spacecraft. The spacecraft may include a plurality of reaction wheels. When a defect occurs in the spacecraft due to a partial malfunction of the reaction wheels, an attitude maneuverability of the spacecraft may be corrected by simultaneously applying the thruster-based attitude controller and the reaction wheel-based attitude controller.

8 Claims, 17 Drawing Sheets

U.S. PATENT DOCUMENTS

| | | | |
|---|---|---|---|
| 7,364,120 B2 * | 4/2008 | Peck | 244/165 |
| 7,654,490 B2 * | 2/2010 | Patel et al. | 244/165 |
| 7,665,695 B2 * | 2/2010 | Wang et al. | 244/164 |
| 7,835,826 B1 * | 11/2010 | Weigl et al. | 701/4 |
| 7,874,519 B2 * | 1/2011 | Brumfield et al. | 244/171 |
| 7,925,439 B2 * | 4/2011 | McCain | 701/468 |
| 8,019,493 B1 * | 9/2011 | Weigl et al. | 701/13 |
| 8,056,863 B2 * | 11/2011 | Wang et al. | 244/164 |
| 8,099,186 B2 * | 1/2012 | Tekawy et al. | 700/226 |
| 8,123,173 B1 * | 2/2012 | Goodzeit et al. | 244/164 |
| 8,186,627 B2 * | 5/2012 | Kamiya et al. | 244/171 |
| 2002/0003193 A1 | 1/2002 | Williams et al. | 244/165 |
| 2002/0148930 A1 | 10/2002 | Yamashita | 244/169 |
| 2003/0098393 A1 * | 5/2003 | Reckdahl et al. | 244/165 |
| 2003/0189138 A1 * | 10/2003 | Bailey | 244/165 |
| 2004/0069905 A1 | 4/2004 | Goodzeit et al. | 244/169 |
| 2006/0186274 A1 | 8/2006 | Wang et al. | 244/158.4 |
| 2008/0223990 A1 * | 9/2008 | Jackson et al. | 244/165 |
| 2010/0044517 A1 * | 2/2010 | Bialke et al. | 244/165 |

FOREIGN PATENT DOCUMENTS

| | | |
|---|---|---|
| JP | 08020398 | 1/1996 |
| KR | 100251006 | 10/2000 |

OTHER PUBLICATIONS

Office Action issued by the Korean Intellectual Property Office on Sep. 17, 2010.

European Search Report dated May 4, 2010.

* cited by examiner

METHOD FOR IMPROVING MANEUVERABILITY AND CONTROLLABILITY BY SIMULTANEOUSLY APPLYING BOTH REACTION WHEEL-BASED ATTITUDE CONTROLLER AND THRUSTER-BASED ATTITUDE CONTROLLER

CROSS-REFERENCE TO RELATED APPLICATION

This application claims the benefit of Korean Patent Application No. 10-2008-0136668, filed on Dec. 30, 2008, in the Korean Intellectual Property Office, the disclosure of which is incorporated herein by reference.

BACKGROUND

1. Field of the Invention

The present invention relates to an attitude control method of a spacecraft of an artificial satellite, and more particularly, to a method of improving a maneuverability and a controllability by simultaneously applying a reaction wheel and a thruster among drive units used to maneuver an attitude of the spacecraft of the artificial satellite.

2. Description of the Related Art

Existing driving units mounted on a spacecraft of an artificial satellite include a thruster-based attitude controller and a reaction wheel-based attitude controller. In the related art, the thruster-based attitude controller and the reaction wheel-based attitude controller are independently operated. Generally, the thruster-based attitude controller has a relatively poorer performance in measuring an attitude accuracy of the spacecraft of the artificial satellite, but is used for a safe operation. The reaction wheel-based attitude controller is generally used to improve an attitude control accuracy when photographing for a mission of earth observation.

A technology of using both the existing thruster-based attitude controller and the reaction wheel-based attitude controller may be an angular momentum dumping technology to dump accumulated angular momentum of reaction wheels using the thruster-based attitude controller when the angular momentum of reaction wheels accumulates due to a external disturbance. Specifically, the reaction wheel-based attitude controller is used as a main attitude controller and the thruster-based attitude controller is used as an auxiliary attitude controller.

Here, a thruster is used in the spacecraft for an attitude control and an orbit control, and thus indicates a thrust force generating device to control an attitude or an orbit of the artificial satellite. For example, the thruster used for a gas injection control device may obtain a high temperature and a high pressure gas by causing a chemical reaction or a decomposition reaction using a catalyst in a high pressure gas or liquid, and then may generate a thrust force by quickly spraying the obtained gas via a nozzle. The existing thruster is symmetrically provided with respect to a reference axis of the spacecraft.

A reaction wheel mounted on the spacecraft of the existing artificial satellite denotes a device to generate a torque for the attitude control of the spacecraft, and thus to use a reaction torque occurring by accelerating or decelerating a speed control wheel using an electric motor. A momentum wheel employed in an attitude control system using a bias momentum scheme has the same functions as the reaction wheel. However, the momentum wheel rotates in a single direction, which is different from the reaction wheel.

As shown in FIGS. 1 and 2, reaction wheels are disposed in the spacecraft to be in a pyramid form. Specifically, as shown in FIG. 1, four reaction wheels $H_{RWA1}$ Axis, $H_{RWA2}$ Axis, $H_{RWA3}$ Axis, and $H_{RWA4}$ Axis are disposed at 90° intervals, and are tilted at an angle of 45° with respect to axes $X_{sc}$ Axis and $Y_{sc}$ Axis of a reference plane $X_{sc}$-$Y_{sc}$ Plane of the spacecraft. As shown in FIG. 2, each of the reaction wheels $H_{RWA1}$ Axis, $H_{RWA2}$ Axis, $H_{RWA3}$ Axis, and $H_{RWA4}$ Axis is twisted at a torsion angle $\beta$ with respect to the reference plane $X_{sc}$-$Y_{sc}$ Plane of the spacecraft. Each of the reaction wheels has an angle of (90°−β) with an axis $Z_{sc}$ Axis viewing from a camera on the spacecraft.

Here, depending on how to determine the torsion angle of each of the reaction wheels $H_{RWA1}$ Axis, $H_{RWA2}$ Axis, $H_{RWA3}$ Axis, and $H_{RWA4}$ Axis, an angular momentum or a torque generated by rotating of each of the four reaction wheels $H_{RWA1}$ Axis, $H_{RWA2}$ Axis, $H_{RWA3}$ Axis, and $H_{RWA4}$ Axis may be differently projected to the axes $X_{sc}$ Axis, $Y_{sc}$ Axis, and $Z_{sc}$ Axis of the spacecraft.

The four reaction wheels $H_{RWA1}$ Axis, $H_{RWA2}$ Axis, $H_{RWA3}$ Axis, and $H_{RWA4}$ Axis may be provided in preparation for a failure of at least one reaction wheel by obtaining a marginal degree of freedom (DOF) corresponding to one reaction wheel. For example, in FIG. 1, if one reaction wheel on Hrwa1 Axis fails, it is possible to control three axes (*$X_{sc}$ Axis, $Y_{sc}$ Axis, and $Z_{sc}$ Axis of the spacecraft) using a limited angular momentum and torques from using the remaining three reaction wheels $H_{RWA2}$ Axis, $H_{RWA3}$ Axis, and $H_{RWA4}$ Axis. In a case where a single reaction wheel is provided on each of three axes, that is, when a total of three reaction wheels are provided on the three axes, respectively, when any one of the three reaction wheels fails, an attitude control may be impossible using the malfunctioning reaction wheel in a corresponding axis. Accordingly, as shown in FIGS. 1 and 2, reaction wheels may be generally disposed in the pyramid form.

In the conventional artificial satellite, even when four reaction wheels are disposed in the pyramid form, a maneuverability of the spacecraft may be significantly deteriorated due to the failure of any one of the four reaction wheels.

FIG. 3 illustrates graphs showing angular momentum envelopes of a spacecraft when all the reaction wheels normally function in the conventional artificial satellite. FIGS. 4A through 4D illustrate graphs showing angular momentum envelopes of the spacecraft when one of the reaction wheels malfunctions.

It can be known from the graphs of FIGS. 3 through 4D that, in a case where any one of the four reaction wheels fails, an angular momentum transferable to reference axes of the spacecraft using the remaining three reaction wheels decreases in comparison to a case where the four reaction wheels normally operate as shown in FIG. 3.

SUMMARY

The present invention provides an attitude control system and method of a spacecraft that may further improve an attitude maneuverability and a controllability when a defect of a reaction wheels occurs in case of an independent use of an thruster-based attitude controller and a reaction wheel-based attitude controller.

According to an aspect of the present invention, there is provided an attitude control system of a spacecraft of an artificial satellite, the system including: a thruster-based attitude controller controlling driving of a thruster mounted on the spacecraft; and a reaction wheel-based attitude controller controlling driving of a reaction wheel mounted on the spacecraft. The spacecraft may include a plurality of reaction wheels. When a defect occurs in the spacecraft due to a partial malfunction of the reaction wheels, an attitude maneuverability of the spacecraft may be corrected by simultaneously applying the thruster-based attitude controller and the reaction wheel-based attitude controller.

When at least two reaction wheels fail, a simultaneous application of the thruster-based attitude controller and the reaction wheel-based attitude controller may make an uncontrollable axis of the spacecraft controllable to thereby obtain a controllability with respect to three axes.

According to another aspect of the present invention, there is provided an attitude control system of a spacecraft of an artificial satellite, the system including: a thruster-based attitude controller which controls firing time of a thrusters mounted on the spacecraft; a thruster model calculating a first torque in proportion to a thruster firing time input from the thruster-based attitude controller; a reaction wheel-based attitude controller controlling driving of a reaction wheel mounted on the spacecraft; a reaction wheel speed controller calculating a reaction wheel torque using a value input from the reaction wheel-based attitude controller; a reaction wheel model calculating an angular momentum and a second torque using the reaction wheel torque; a sum summing up the first torque and the second torque; and a spacecraft dynamics model simulating rotational motion of the spacecraft according to the torque inputs from the sum.

The attitude control system may further include a gyro model forming a closed loop to feed back an angular velocity and the attitude of the spacecraft changed in the spacecraft dynamics model to the thruster-based attitude controller and the reaction wheel-based attitude controller. The gyro model may measure and feed back the angular velocity and the attitude of the spacecraft in proportion to the first torque and the second torque.

The attitude control system may further include: an integrator transferring, to the thruster-based attitude controller, the angular velocity output from the gyro model; and an quaternion error propagator transferring, to the reaction wheel-based attitude controller, the angular velocity output from the gyro model. An angle signal of the spacecraft, that is information associated with the changed attitude output from the integrator, and a signal summed up with angle information associated with the change in the attitude of the spacecraft, input from an attitude angle command, may be input into the thruster-based attitude controller. An angular velocity signal output from the gyro model, and a corrected value output from the quaternion error propagator may be input into the reaction wheel-based attitude controller.

The thruster-based attitude controller may be set to have a gain in proportion to an angle dead-zone so that the thruster-based attitude controller and the reaction wheel-based attitude controller may simultaneously operate in an attitude maneuver having a great attitude error, and so that only the reaction wheel-based attitude controller may operate when the spacecraft is in an attitude stead state because the thruster-based attitude controller is not working due to the dead-zone characterisitics.

According to still another aspect of the present invention, there is provided an attitude control method of a spacecraft of an artificial satellite, the method including: calculating a thruster thrust time for an attitude control of the spacecraft; calculating a first torque in proportion to the calculated thruster thrust time, the first torque occurring in the spacecraft due to a thruster; calculating an angular momentum and a torque acting on a reaction wheel; calculating a second torque using the calculated torque of the reaction wheel, the second torque occurring in the spacecraft due to the reaction wheel; and summing up the first torque and the second torque to calculate an angular velocity of the spacecraft for the attitude control of the spacecraft.

A closed loop may be formed so that the calculated angular velocity of the spacecraft may be fed back to the calculating of the thruster thrust time and the calculating of the angular velocity and the torque in proportion to a magnitude of the first torque and the second torque. Also, the calculating of the thruster thrust time may sum up an angle signal, input for the attitude change of the spacecraft, and an angle signal, changed by integrating the angular velocity of the spacecraft, to calculate the thruster thrust time of the thruster. Also, the calculating of the angular velocity and the torque may sum up an angular velocity signal of the spacecraft and a corrected error value of the angular velocity signal to calculate the angular momentum and the torque acting on the reaction of spacecraft.

EFFECT

According to embodiments of the present invention, since a reaction wheel-based attitude controller and a thruster-based attitude controller are combined so that two attitude controllers may control an attitude of a spacecraft, it is possible to improve a maneuverability and a controllability.

Also, according to embodiments of the present invention, even when a defect occurs due to a failure of at least one reaction wheel drive unit, it is possible to effectively control an attitude of a spacecraft. In addition, since a maneuverability convergence time of the spacecraft becomes faster, it is possible to enhance an operation efficiency of the spacecraft.

Also, according to embodiments of the present invention, in the case of an attitude maneuver having a relatively great error such as an initial attitude maneuver of the spacecraft, a thruster-based attitude controller and a reaction wheel-based attitude controller may be simultaneously applied. Therefore, it is possible to improve a maneuverability. When the spacecraft reaches an attitude steady state, the reaction wheel-based attitude controller may operate alone. Therefore, it is possible to accurately control the attitude of the spacecraft while a camera of the spacecraft is directed towards the earth.

Also, according to embodiments of the present invention, when a spacecraft is in an attitude steady state, a thruster-based attitude controller may not operate because of it's dead-zone characterisitics. Therefore, it is possible to prevent an unnecessary torque from occurring due to a thruster. In addition, it is possible to prevent an adverse effect caused by the thruster with respect to an attitude accuracy of the spacecraft.

Also, according to embodiments of the present invention, it is possible to obtain an independent gain characteristic of each of a reaction wheel-based attitude controller and a thruster-based attitude controller without a separate switching element to combine the reaction wheel-based attitude controller and the thruster-based attitude controller. In addition, there is no need to consider an instability that may occur in switching between the reaction wheel-based attitude controller and the thruster-based attitude controller.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
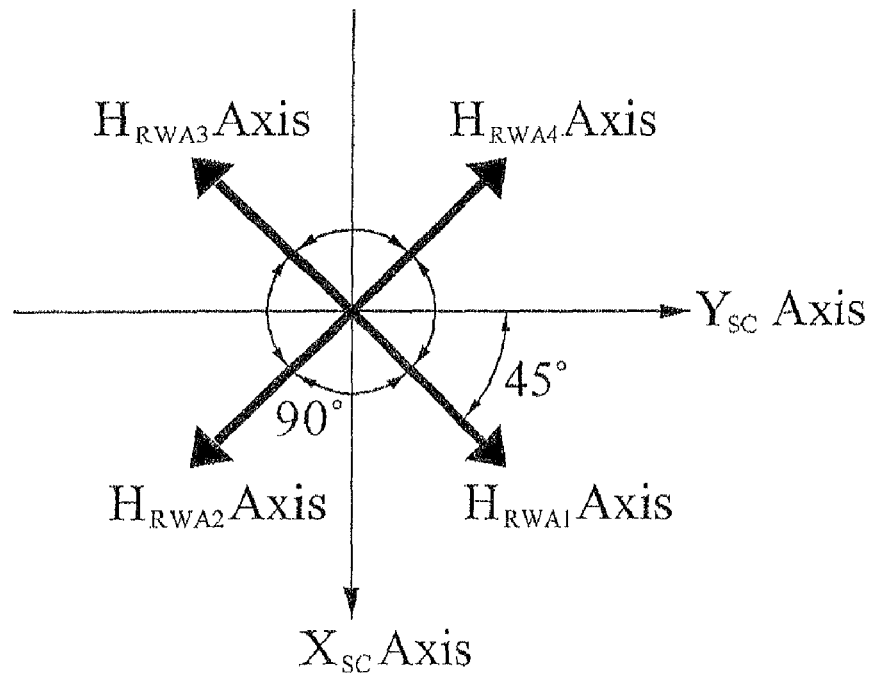
FIGS. 1 and 2 are arrangement plans for describing arrangements of four reaction wheels in an existing spacecraft.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

Hereinafter, embodiments of the present invention will be described in detail with reference to the accompanying drawings. However, the present invention is not limited thereto or is restricted thereby. When it is determined detailed description related to a known function or configuration they may render the purpose of the present invention unnecessarily ambiguous in describing the present invention, the detailed description will be omitted here.

Hereinafter, an attitude control method and an attitude control system 100 of a spacecraft of an artificial satellite according to an embodiment of the present invention will be described in detail with reference to FIG. 5.

The attitude control system 100 may include a thruster-based attitude controller 110, a reaction wheel-based attitude controller 120, and a spacecraft dynamics model 130.

The thruster-based attitude controller 110 corresponds to a controller controlling an attitude of the spacecraft by controlling a thruster mounted on the spacecraft. The reaction wheel-based attitude controller 120 corresponds to a controller controlling the attitude of the spacecraft by controlling a reaction wheel mounted on the spacecraft. As described with reference to FIGS. 1 and 2, four reaction wheels may be disposed in the spacecraft in a pyramid form.

The present embodiment will be described using an example that the thruster-based attitude controller 110 and the reaction wheel-based attitude controller 120 adopt a proportional-integral-derivative (PID) scheme. However, it is only an example and thus the thruster-based attitude controller 110 and the reaction wheel-based attitude controller 120 may use various types of schemes.

The thruster-based attitude controller 110 may transfer, to a thruster model 111, a thruster thrust time Thrust_Time that is an output value, and may generate a torque Torque that is in proportion to the thruster firing time Thrust_Time.

The reaction wheel-based attitude controller 120 may output, using a reaction wheel speed controller 121, a torque Trw to act on a reaction wheel. A reaction wheel model 122 may transfer, to the spacecraft dynamics model 130, an angular momentum Hsc and a torque Tsc of the reaction wheel using the output torque Trw. The torque Tsc input into the spacecraft dynamics model 130 may change the attitude of the spacecraft. Here, the attitude control system 100 of the spacecraft may sum up, using a sum 131, the torque Torque output from the thruster-based attitude controller 110 and the torque Tsc output from the reaction wheel-based attitude controller 120, and transfer the result to the spacecraft dynamics model 130. The spacecraft dynamics model 130 influenced by a external disturbance 132. A closed loop may be formed so that an attitude and an angular velocity changed in the spacecraft dynamics model 130 may be input via a gyro model 140 into the thruster-based attitude controller 110 and the reaction wheel-based attitude controller 120. In particular, the attitude control system 100 of the spacecraft may form the closed loop so that the changed attitude and angular velocity may be fed back in proportion to magnitudes of the torques Torque and Tsc input from the thruster-based attitude controller 110 and the reaction wheel-based attitude controller 120, respectively.

Specifically, an angular velocity signal Rate Wsc output from the gyro model 140 may pass through an integrator 141 and be summed up with a signal output from an attitude angle command 101 in a sum 103, and thereby be input into the thruster-based attitude controller 110. The angular velocity signal Rate Wsc output from the gyro model 140 may be converted to angle information via the integrator 141. The angle signal output from the attitude angle command 101, and the angle signal output from the integrator 141 may be summed up in the sum 103 and thereby be input into the thruster-based attitude controller 110. When a corrected value ang_err of an angle where the spacecraft needs to move for its attitude change is input, the thruster-based attitude controller 110 may calculate a thruster thrust time where the thruster needs to operate for the attitude change of the spacecraft, using the input corrected angle.

The angular velocity signal Rate Wsc output from the gyro model 140, and a corrected value Esc of the angular velocity signal Rate Wsc via a quaternion error propagator 104 may be input into the reaction wheel-based attitude controller 120. Specifically, the reaction wheel-based attitude controller 120 may calculate a torque ACS_swTrwcom to act on the reaction wheel speed controller 121, using the angular velocity signal Wsc input from the gyro model 140, the error value Esc input from the quaternion error propagator 104, and a feedback value Hmrw fed back from the reaction wheel model 122. Also, the reaction wheel-based attitude controller 120 may receive the torque Trw of the reaction wheel calculated in the reaction wheel speed controller 121 to thereby calculate the torque Tsc that is input into the spacecraft dynamics model 130.

Figure 5:
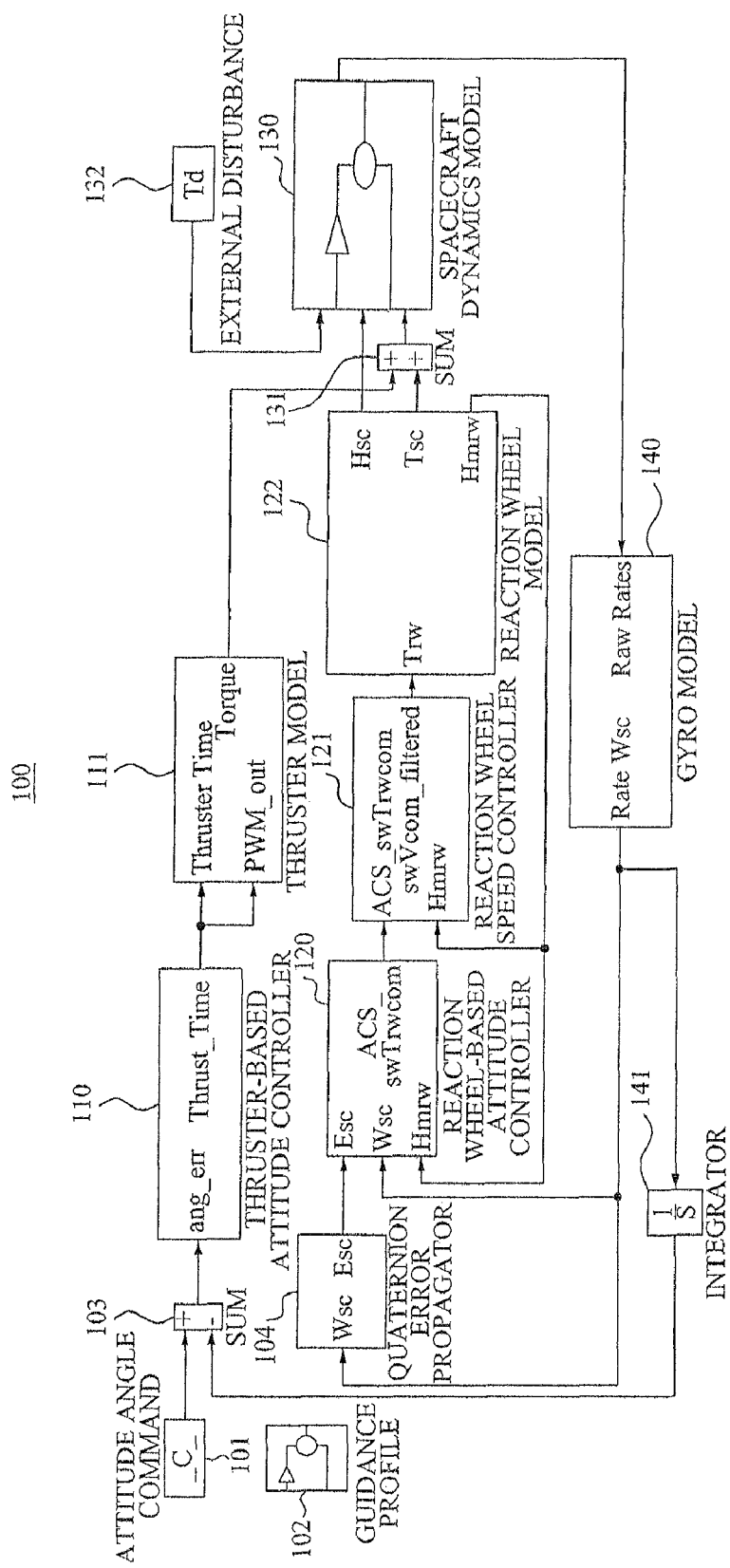
FIG. 5 is a block diagram illustrating an example of an attitude control system of a spacecraft according to an embodiment of the present invention.

In FIG. 5, the attitude angle command 101 corresponds to a controller inputting an angle value for the attitude control of the spacecraft. A guidance profile 102 corresponds to a controller indicating an attitude movement profile of the spacecraft.

According to an embodiment of the present invention, the torques Torque and Tsc output from the thruster-based attitude controller 110 and the reaction wheel-based attitude controller 120 may be summed up and thereby be transferred to the spacecraft dynamics model 130. Therefore, even when any one reaction wheel of the reaction wheel fails, a torque control may be added using the thruster. Accordingly, it is possible to compensate for a deterioration in a maneuverability of the spacecraft occurring due to the above failure of the reaction wheel.

Here, in a case where a stability is obtained in designing of the thruster-based attitude controller 110 and the reaction wheel-based attitude controller 120, the stability may be obtained even when the thruster-based attitude controller 110 and the reaction wheel-based attitude controller 120 are combined and thereby are used. Accordingly, it is possible to simultaneously employ the thruster-based attitude controller 110 and the reaction wheel-based attitude controller 120. When the above requirements are unsatisfied, it is possible to modify the design so that the requirements may be satisfied by adjusting a gain of a PID controller acting on each of the thruster-based attitude controller 110 and the reaction wheel-based attitude controller 120. However, the above matter may need to be considered in developing of an attitude controller of the spacecraft, and a gain value may be different for each spacecraft. Therefore, description related thereto will be omitted in this invention.

In general, momentum dumping technique to prevent a reaction wheel from reaching a saturation speed in the spacecraft may use a magnetic torquer. It is a well-known scheme in existing researches and thus description related thereto will be omitted.

The thruster-based attitude controller 110 and the reaction wheel-based attitude controller 120 may be set to not affect each other while setting a gain of each of the to thruster-based attitude controller 110 and the reaction wheel-based attitude controller 120, when they reach an attitude maneuver and an attitude steady state. Also, the thruster-based attitude controller 110 may have a gain in proportion to an angle dead zone.

Specifically, in the attitude control system 100, when an attitude error of the spacecraft is great, the thruster-based attitude controller 110 may change the thruster firing time so that the thruster may control the attitude of the spacecraft. When the spacecraft is in the angle dead zone due to an insignificant attitude error of the spacecraft, the thruster-based attitude controller 110 may be set not to fire the thruster.

Specifically, in an early attitude maneuver of the spacecraft, an error between a command attitude and an actual attitude may become great. In the case of the attitude maneuver having the great error, the thruster-based attitude controller 110 and the reaction wheel-based attitude controller 120 may simultaneously operate. When the spacecraft is in the attitude steady state, the thruster-based attitude controller 110 may not operate and only the reaction wheel-based attitude controller 120 may operate. As a result, it is possible to accurately control the attitude of the spacecraft at the steady-state.

According to an embodiment of the present invention, in the case of the attitude maneuver of the spacecraft, it is possible to simultaneously operate reaction wheels and the thruster by simultaneously applying the thruster-based attitude controller 110 and the reaction wheel-based attitude controller 120, and thereby improve a maneuverability. When the spacecraft reaches the attitude steady state, the reaction wheel-based attitude controller 120 may operate alone. Through this, it is possible to accurately control the attitude of the spacecraft while a camera of the spacecraft is directed towards the earth.

Also, according to an embodiment of the present invention, the thruster-based attitude controller 110 does not operate whereby it is possible to prevent an unnecessary torque from occurring due to the thruster. Here, since the thruster-based attitude controller 110 operates in a pulse form when the torque occurs, the accurate control may be difficult. However, when the spacecraft is in the attitude steady state, the thruster-based attitude controller 110 does not operate and thus it is possible to solve the above problem automatically.

Also, according to an embodiment of the present invention, there is no need for a separate switching element to combine the thruster-based attitude controller 110 and the reaction wheel-based attitude controller 120. It is possible to obtain an independent gain characteristic of each of the thruster-based attitude controller 110 and the reaction wheel-based attitude controller 120. In addition, there is no need to consider an instability that may occur in switching between the thruster-based attitude controller 110 and the reaction wheel-based attitude controller 120.

Hereinafter, an effect of the attitude control system 100 according to an embodiment of the present invention will be described with reference to FIGS. 6 through 9D.

Figure 2:
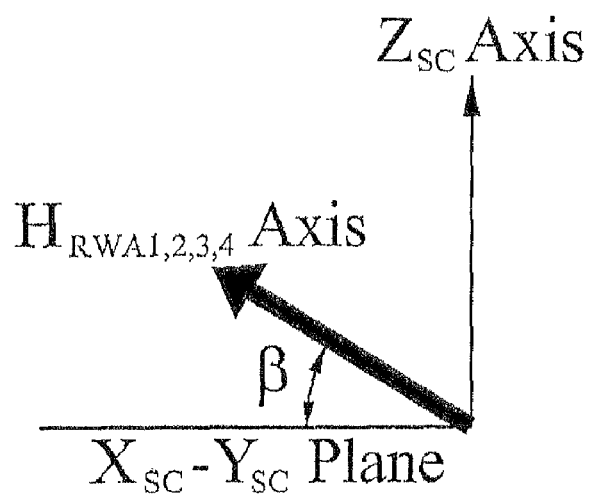
Figure 3:
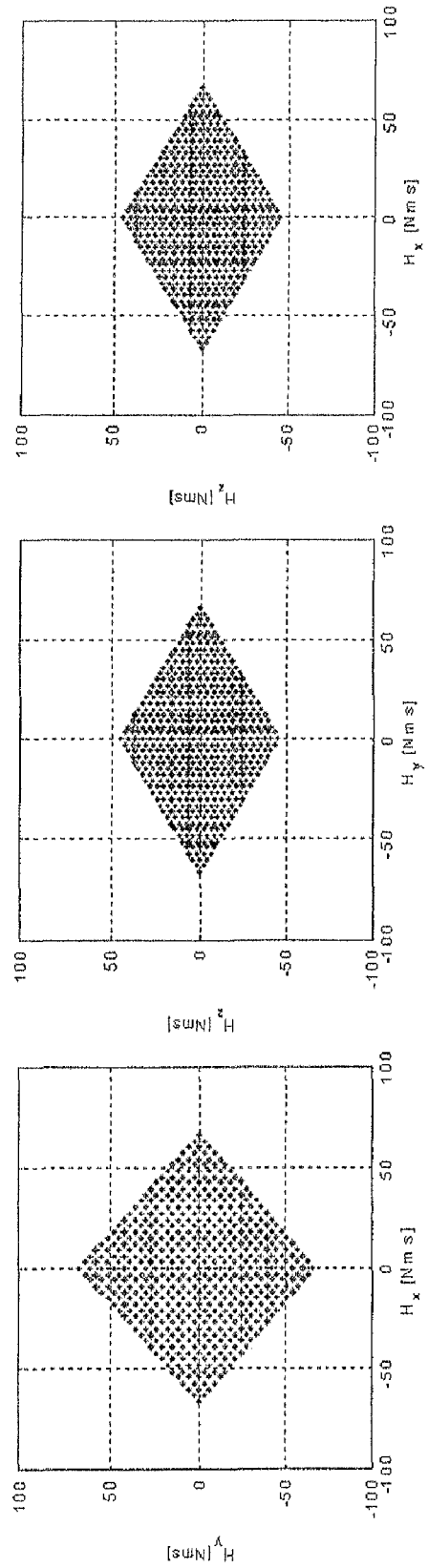
FIG. 3 illustrates angular momentum envelopes of the spacecraft when all the four reaction wheels normally function in the existing spacecraft.
Figure 4A:
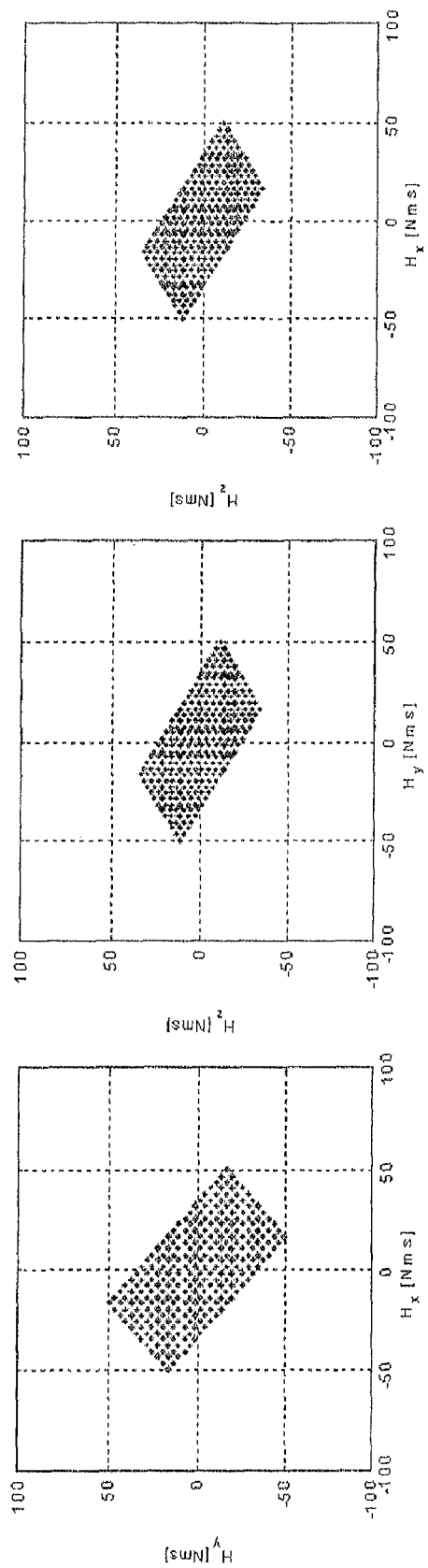
FIGS. 4A through 4D illustrate angular momentum envelopes of the spacecraft when each one of the four reaction wheels fails in the existing spacecraft.
Figure 4B:
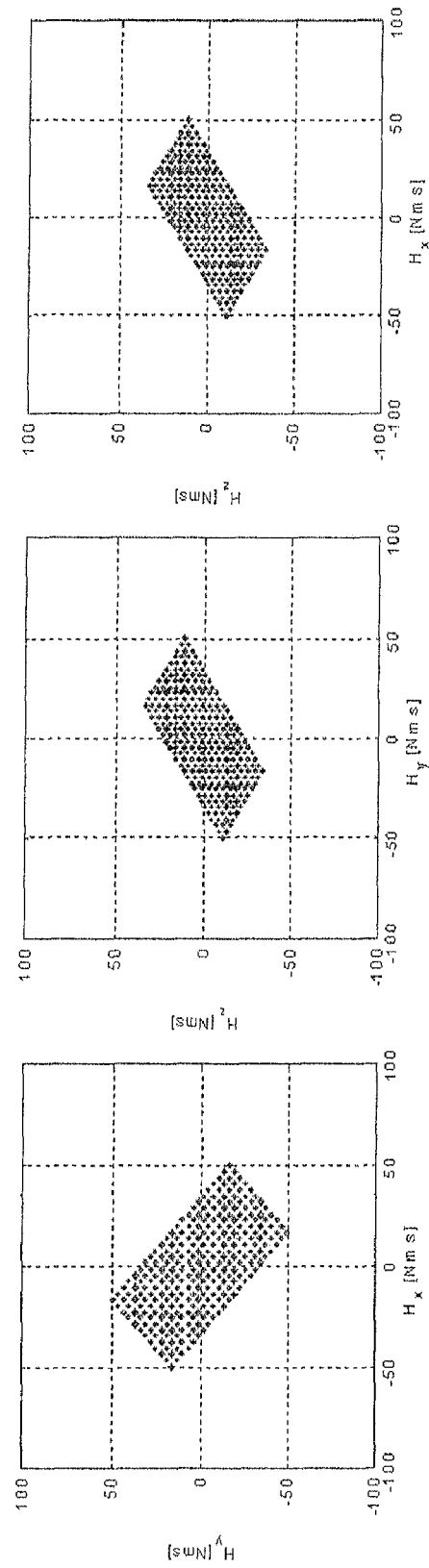
Figure 4C:
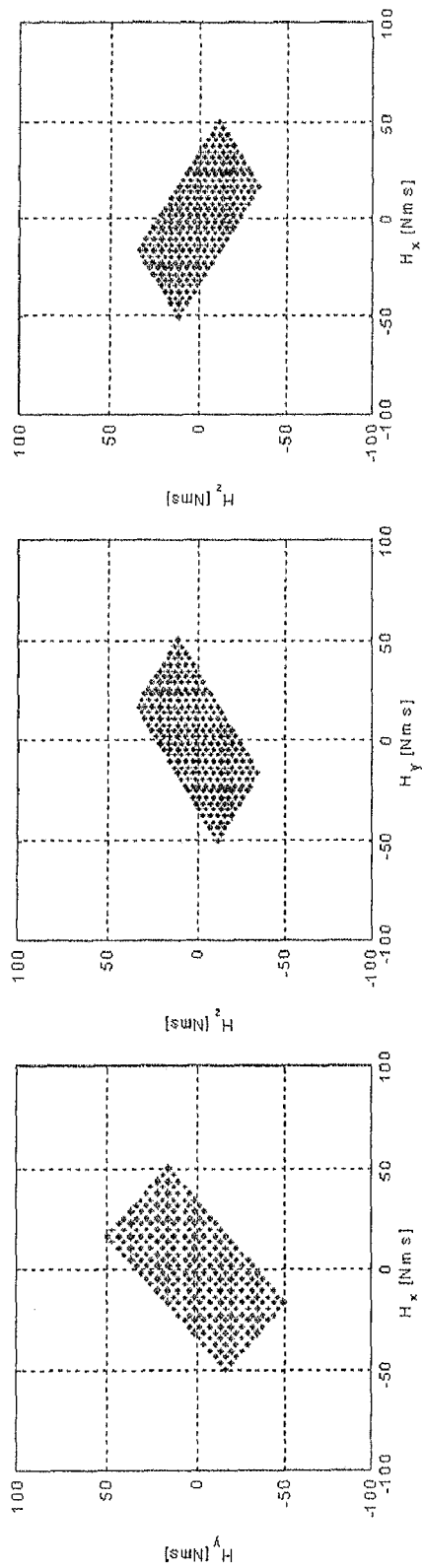
Figure 4D:
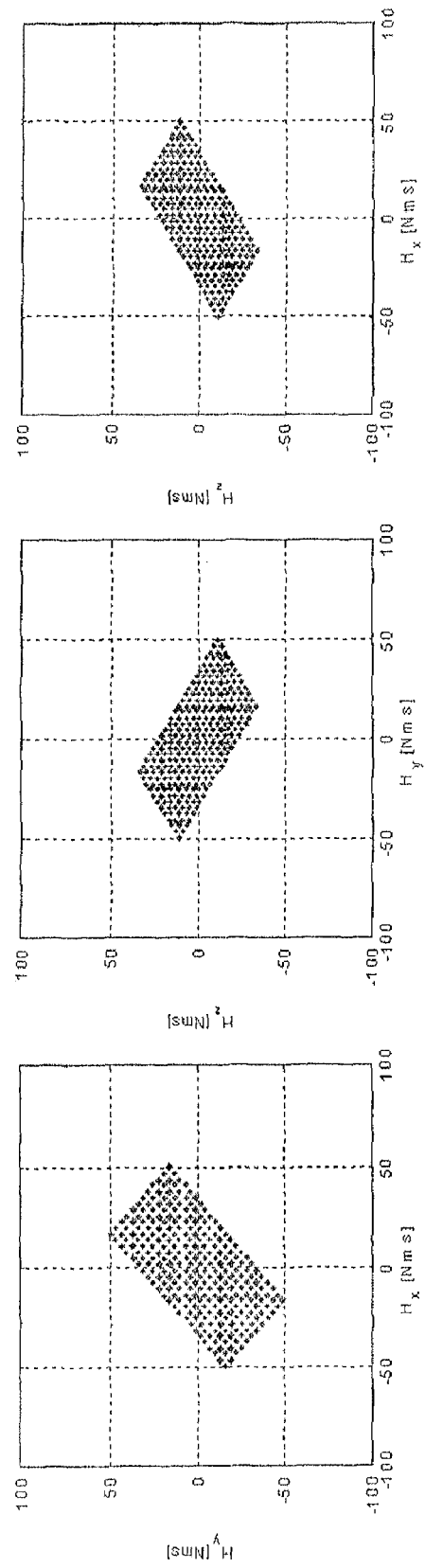

In the following description, four reactions wheels are disposed in the same structure as the existing reaction wheels of FIGS. 1 and 2. For ease of description, four reactions wheels $H_{RWA1}$ Axis, $H_{RWA2}$ Axis, $H_{RWA3}$ Axis, and $H_{RWA4}$ Axis are sequentially referred to as a first reaction wheel, a second reaction wheel, a third reaction wheel, and a fourth reaction wheel.

Figure 6:
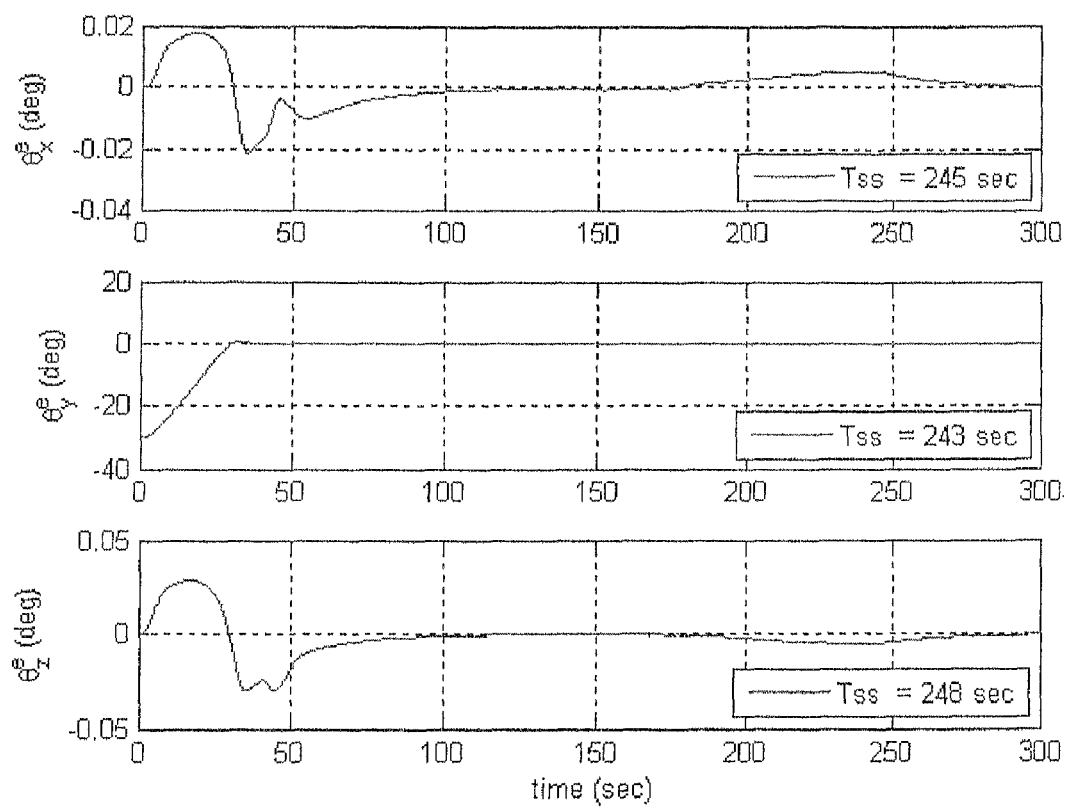
FIG. 6 illustrates graphs showing simulation results of an attitude control of a spacecraft when a first reaction wheel among four reaction wheels fails.
Figure 7A:
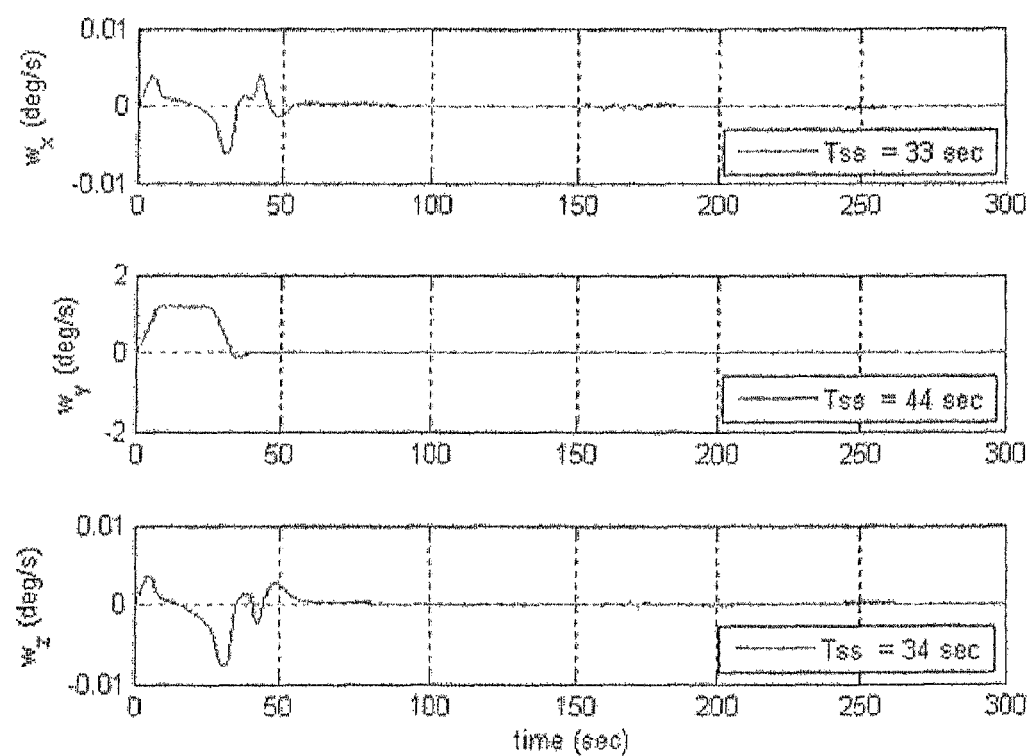
FIG. 7A illustrates graphs showing a change in angular velocities of the spacecraft in FIG. 6.
Figure 7B:
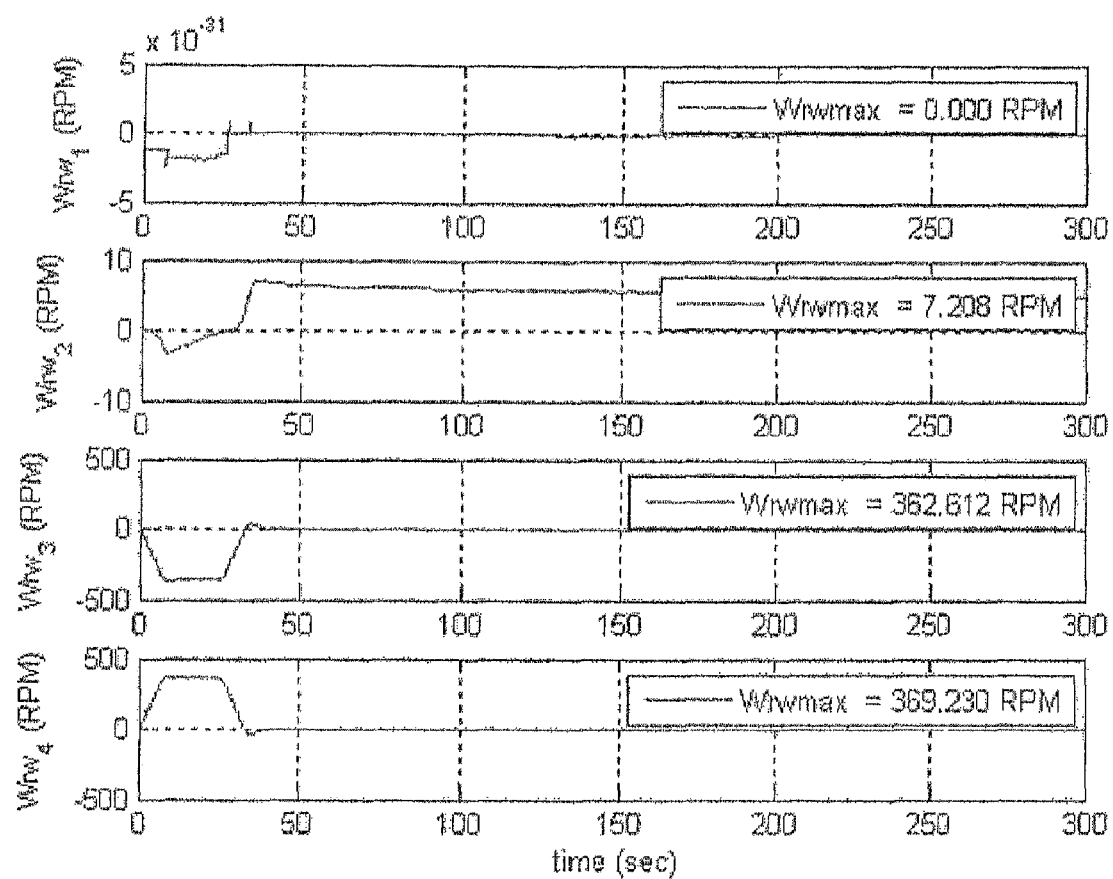
FIG. 7B illustrates graphs showing a change in rotational speeds of the reaction wheels in FIG. 6.
Figure 7C:
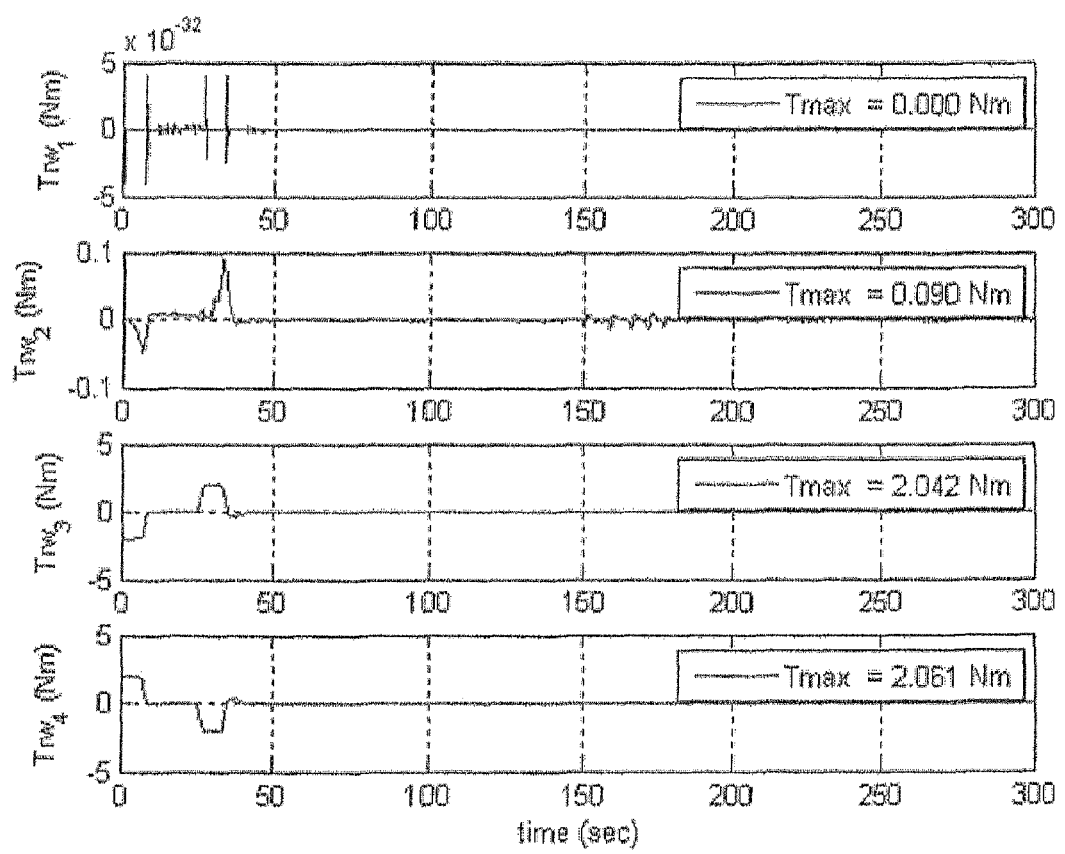
FIG. 7C illustrates graphs showing a change in torques of the reaction wheels in FIG. 6C.
Figure 7D:
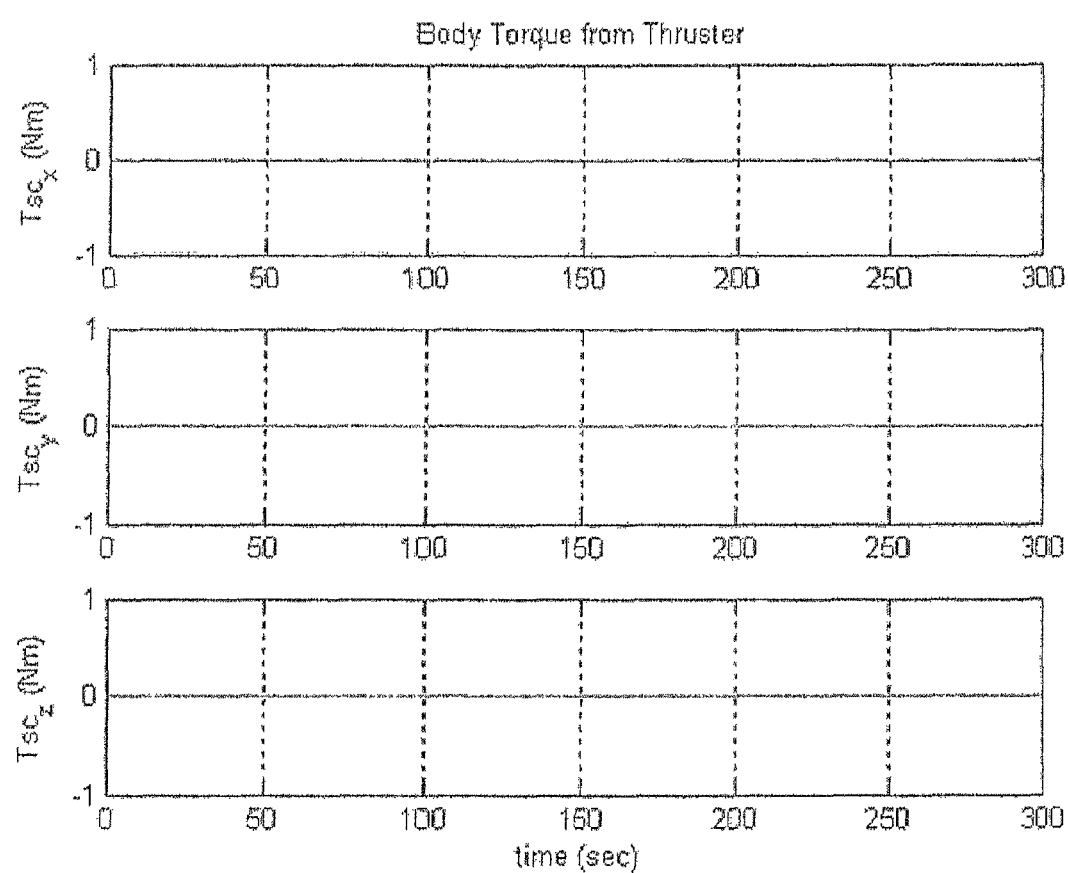
FIG. 7D illustrates graphs showing a change in torques of the spacecraft occurring due to an effect of a thruster in FIG. 6.

FIGS. 6 through 7D are comparison examples, and illustrate graphs showing simulation results when an attitude maneuver of 30° from a pitch axis of an existing spacecraft is commanded due to a failure of the first reaction wheel $H_{RWA1}$ Axis among the four reaction wheels.

For reference, FIG. 6 illustrates graphs showing simulation results of attitude maneuver of the existing spacecraft when only a reaction wheel-based attitude controller operates without operating a thruster-based attitude controller in the existing spacecraft.

Also, FIG. 7A illustrates graphs showing a change in angular velocities W_x, W_y, and W_z of the spacecraft in FIG. 6, FIG. 7B illustrates graphs showing a change in rotational speeds Wrw_1, Wrw_2, Wrw_3, and Wrw_4 of the spacecraft in FIG. 6, FIG. 7C illustrates graphs showing a change in torques Trw_1, Trw_2, Trw_3, and Trw_4 of the reaction wheels (*$H_{RWA1}$ Axis, $H_{RWA2}$ Axis, $H_{RWA3}$ Axis, and $H_{RWA4}$ Axis, and FIG. 7D illustrates graphs showing a change in torques Tsc_x, Tsc_y, and Tsc_z of the spacecraft occurring due to an effect of a thruster in FIG. 6.

Figure 8:
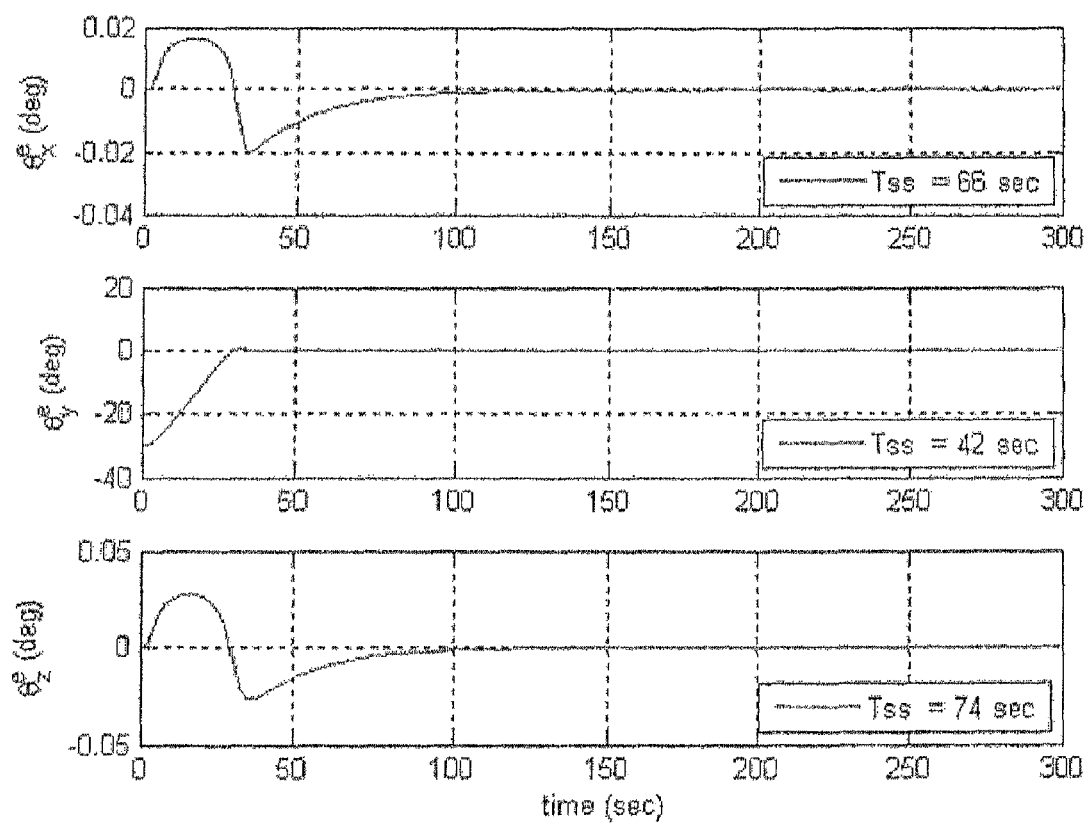
FIG. 8 illustrates graphs showing simulation results of an attitude control of a spacecraft using an attitude control system of the spacecraft when a first reaction wheel among reaction wheels fails according to an embodiment of the present invention.
Figure 9A:
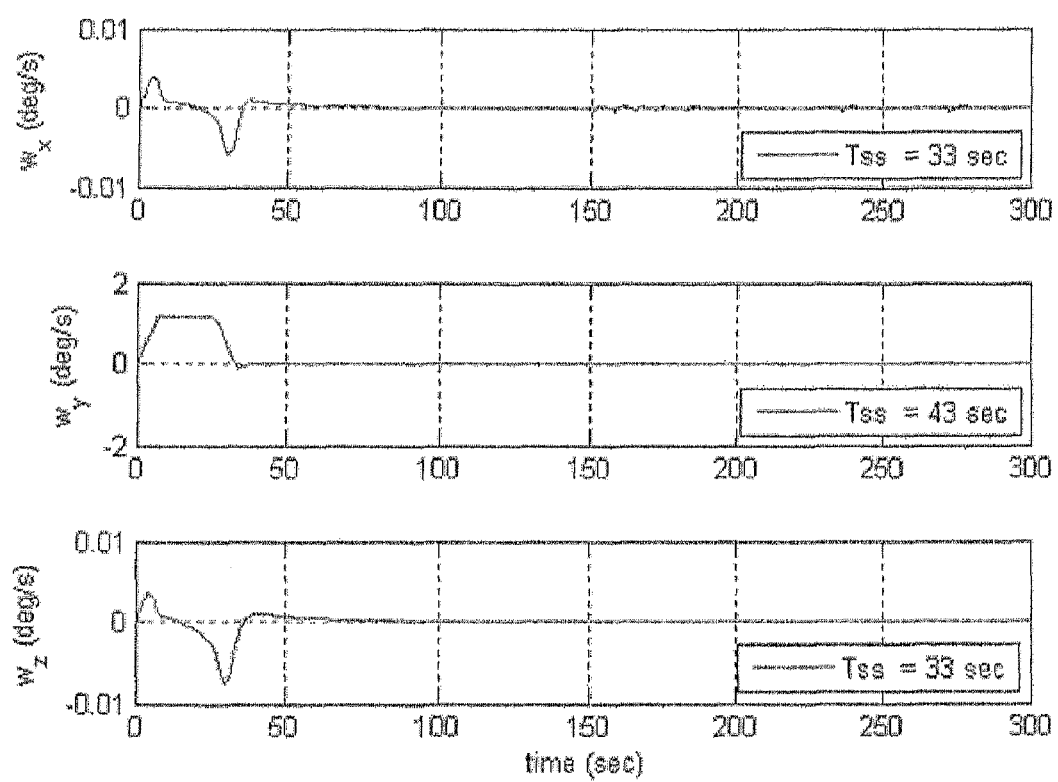
FIG. 9A illustrates graphs showing a change in angular velocities of the spacecraft in FIG. 8.
Figure 9B:
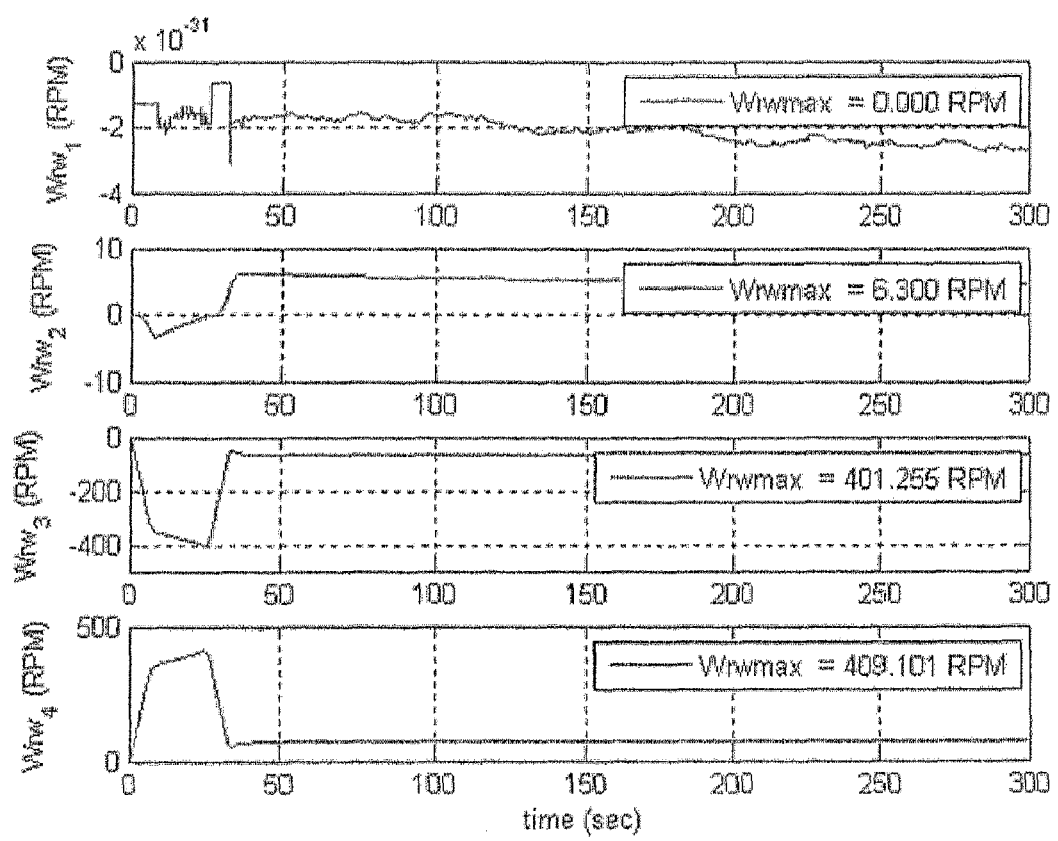
FIG. 9B illustrates graphs showing a change in rotational speeds of the reaction wheels in FIG. 8.
Figure 9C:
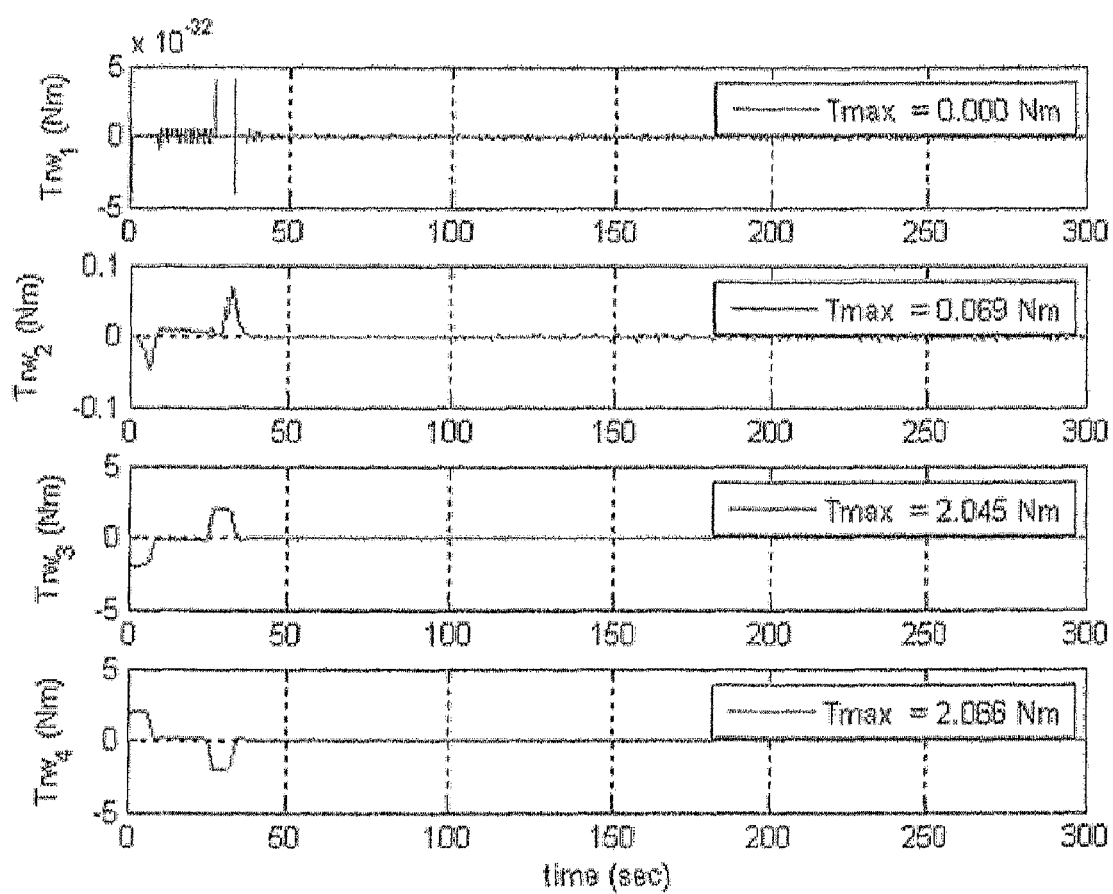
FIG. 9C illustrates graphs showing a change in torques of the reactions wheels in FIG. 8.
Figure 9D:
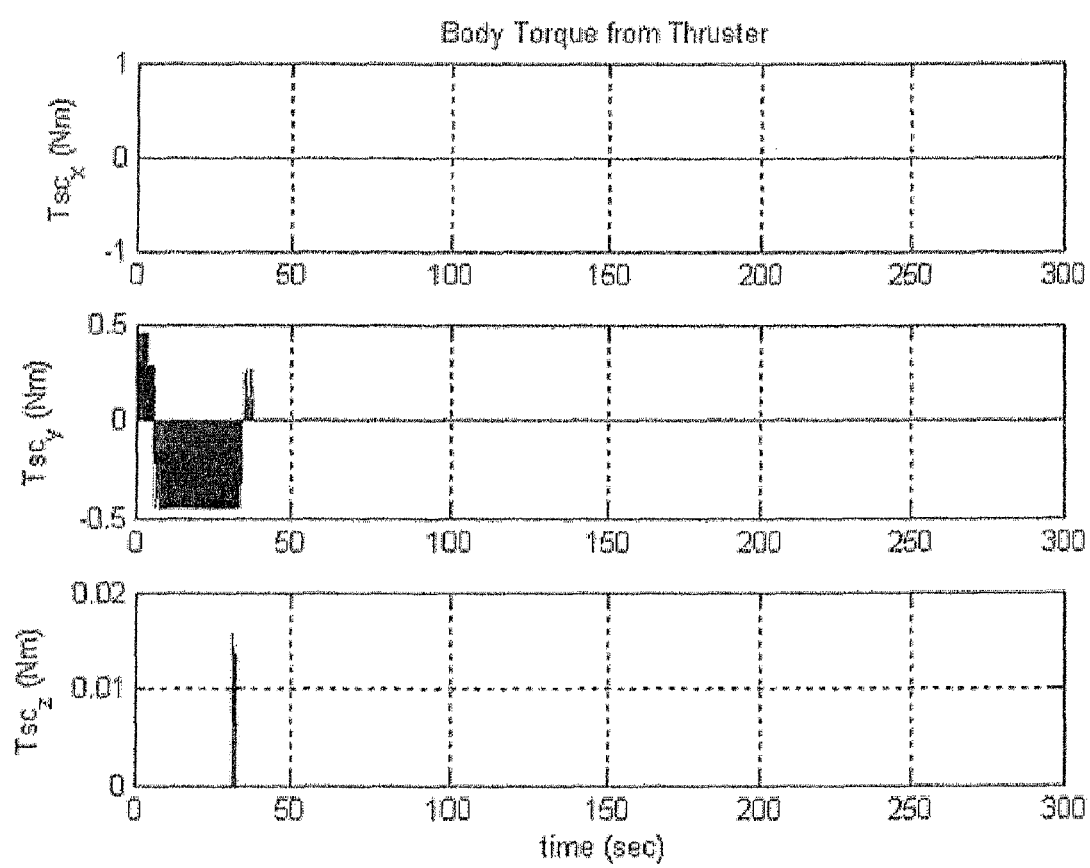
FIG. 9D illustrates graphs showing a change in torques of the spacecraft occurring due to an effect of a thruster in FIG. 8.

FIGS. 8 through 9D illustrate simulation results of an attitude control of a spacecraft using the attitude control system 100 of the spacecraft according to an embodiment of the present invention.

FIG. 8 illustrates graphs showing the simulation results of the attitude control of the spacecraft using the attitude control system 100 according to an embodiment of the present invention. FIGS. 9A through 9D illustrate graphs showing a state of each of the spacecraft and reaction wheels in FIG. 8.

Specifically, as in FIG. 6, FIG. 8 illustrates simulation results of the attitude control system 100 when the attitude maneuver of 30° from a pitch axis Ysc Axis of the spacecraft is commanded due to the failure of the first reaction wheel $H_{RWA1}$ Axis among the four reaction wheels.

FIG. 9A illustrates graphs showing a change in angular velocities W_x, W_y, and W_z of the spacecraft in FIG. 8, FIG. 9B illustrates graphs showing a change in rotational speeds Wrw_1, Wrw_2, Wrw_3, and Wrw_4 of the reaction wheels in FIG. 8, FIG. 9C illustrates graphs showing a change in torques Trw_1, Trw_2, Trw_3, and Trw_4 of the reaction wheels (*$H_{RWA1}$ Axis, $H_{RWA2}$ Axis, $H_{RWA3}$ Axis, and $H_{RWA4}$ Axis in FIG. 8, and FIG. 9D illustrates graphs showing a change in torques Tsc_x, Tsc_y, and Tsc_z of the spacecraft occurring due to an effect of a thruster in FIG. 8.

According to the above comparative example, as shown in FIG. 6, when the attitude maneuver of 30° from the pitch axis Ysc Axis of the spacecraft is order, it takes about 243 through 248 seconds for the attitude error of the spacecraft to fall within 0.005°. For example, Tss=245 seconds in θxe, Tss=243 seconds in θye, and Tss=248 seconds in θze.

Referring to FIG. 8, it takes about 42 through 74 seconds that the attitude error of the spacecraft falls within 0.005°. For example, Tss=66 seconds in θxe, Tss=42 seconds in θye, and Tss=74 seconds in θze. Specifically, it can be known that a time for the attitude maneuver is significantly reduced in comparison to the example of FIG. 6.

Also, according to the above comparison example, as shown in FIGS. 7B and 7C, since a first reaction wheel drive unit fails, it can be known that the rotational speed Wrw_1 and the torque Trw_1 of the first reaction wheel are zero.

According to an embodiment of the present invention, as shown in FIGS. 9B and 9C, since a first reaction wheel drive unit malfunctions, it can be known that the rotational speed Wrw_1 and the torque Trw_1 of the first reaction wheel are zero.

Here, the comparison example corresponds to a case where the attitude maneuver of the spacecraft is performed by operating only the existing reaction wheel-based attitude controller. Therefore, as shown in FIG. 7D, it can be verified that the torques Tsc_x, Tsc_y, and Tsc_z of the spacecraft do not occur due to the thruster, that is, Tsc_x=0, Tsc_y=0, and Tsc_z=0.

According to an embodiment of the present invention, as shown in FIG. 9D, in the case of the attitude maneuver, that is, before about 50 seconds have passed, since the thruster operates so that the spacecraft may rotate into the pitch direction Ysc Axis, it can be known that the pulse torque Tsc_y occurs in the spacecraft. When the spacecraft is in the attitude steady state, that is, after about 50 seconds, the thruster may not operate. Therefore, the torques Tsc_x, Tsc_y, and Tsc_z of the spacecraft caused by the thruster may not operate. Only the reaction wheels may operate to thereby accurately perform the attitude control. It can be known from FIG. 9B that the rotational speeds Wrw_1, Wrw_2, Wrw_3, and Wrw_4 of the reaction wheels converge to a predetermined value, instead of zero.

Accordingly, even when at least one reaction wheel fails due to a simultaneous application of the thruster-based attitude controller 110 and the reaction wheel-based attitude controller 120, the attitude control system 100 of the spacecraft may improve a maneuverability of the spacecraft and may also obtain a controllability with respect to three axes of the spacecraft.

In the aforementioned examples, description is made that, when at least one reaction wheel does not operate due to a malfunction of at least one reaction wheel drive unit the attitude of the spacecraft is controlled using the remaining three reaction wheels and the thruster. However, the present invention is not limited thereto. When at least two reaction wheel drive units fails, the attitude control system 100 according to an embodiment of the present invention may be similarly applicable.

For example, in a case where a single reaction wheel fails, and also in a case where two or three reaction wheels malfunction, the thruster-based attitude controller 110 may simultaneously operate, whereby it is possible to improve a maneuverability of the spacecraft. When two to three reaction wheels do not operate and thus there is a need to improve the maneuverability, or to perform an additional control with respect to an uncontrollable axis, an additional drive unit and attitude controller may be further required. The additional attitude controller may be managed by the thruster-based attitude controller 110.

When all the four reaction wheels fails, the attitude control using the reaction wheel-based attitude controller 120 may be meaningless. Therefore, an automatic conversion to the thruster-based attitude controller 110 may be performed.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. An attitude control system of a spacecraft of an artificial satellite, the system comprising:
    a thruster-based attitude controller which control firing time of a thruster mounted on the spacecraft;
    a thruster model calculating a first torque in proportion to a thruster firing time input from the thruster-based attitude controller;
    a reaction wheel-based attitude controller controlling driving of a reaction wheel mounted on the spacecraft;
    a reaction wheel speed controller calculating a reaction wheel torque using a value input from the reaction wheel-based attitude controller;
    a reaction wheel model calculating an angular momentum and a second torque using the reaction wheel torque;
    a sum summing up the first torque and the second torque; and
    a spacecraft dynamics model simulating rotational motion of the spacecraft according to the torque input from the sum.

2. The system of claim 1, further comprising:
    a gyro model forming a closed loop to feed back an angular velocity and the attitude of the spacecraft changed in the spacecraft dynamics model to the thruster-based attitude controller and the reaction wheel-based attitude controller.

3. The system of claim 2, wherein the gyro model feeds back the angular velocity and the attitude of the spacecraft to the thruster-based attitude controller and the reaction wheel-based attitude controller in proportion to a magnitude of the first torque and the second torque.

4. The system of claim 3, further comprising:
    an integrator transferring, to the thruster-based attitude controller, the angular velocity output from the gyro model; and
    a quaternion error propagator transferring, to the reaction wheel-based attitude controller, the angular velocity output from the gyro model, wherein a signal output from the integrator, and a signal summed up with angle information associated with the change in the attitude of the spacecraft, input from an attitude angle command, are input into the thruster-based attitude controller, and an angular velocity signal output from the gyro model, and a corrected value output from the quaternion error propagator are input into the reaction wheel-based attitude controller.

5. The system of claim 1, wherein the thruster-based attitude controller is set to have a gain in proportion to an angle dead-zone so that the thruster-based attitude controller and the reaction wheel-based attitude controller simultaneously operate in an attitude maneuver having a great attitude error, and so that only the reaction wheel-based attitude controller operates when the spacecraft is in an attitude steady state.

6. An attitude control method of a spacecraft of an artificial satellite, the method comprising:
  calculating a thruster firing time for an attitude control of the spacecraft;
  calculating a first torque in proportion to the calculated thruster firing time, the first torque occurring in the spacecraft due to a thruster;
  calculating an angular momentum and a torque acting on a reaction wheel;
  calculating a second torque using the calculated torque of the reaction wheel, the second torque occurring in the spacecraft due to the reaction wheel; and
  summing up the first torque and the second torque to calculate an angular velocity of the spacecraft for the attitude control of the spacecraft.

7. The method of claim 6, wherein a closed loop is formed so that the calculated angular velocity of the spacecraft is fed back to the calculating of the thruster thrust time and the calculating of the angular velocity and the torque in proportion to a magnitude of the first torque and the second torque.

8. The method of claim 7, wherein:
  the calculating of the thruster firing time sums up an angle signal, input for the attitude change of the spacecraft, and an angle signal, changed by integrating the angular velocity of the spacecraft, to calculate the thruster firing time of the thruster, and
  the calculating of the angular velocity and the torque sums up an angular velocity signal of the spacecraft and a corrected error value of the angular velocity signal to calculate the angular momentum and the torque acting on the reaction wheel.

* * * * *